April 20, 1943. E. M. SCHARA 2,317,225
WAFFLE IRON
Filed May 2, 1941 2 Sheets-Sheet 1
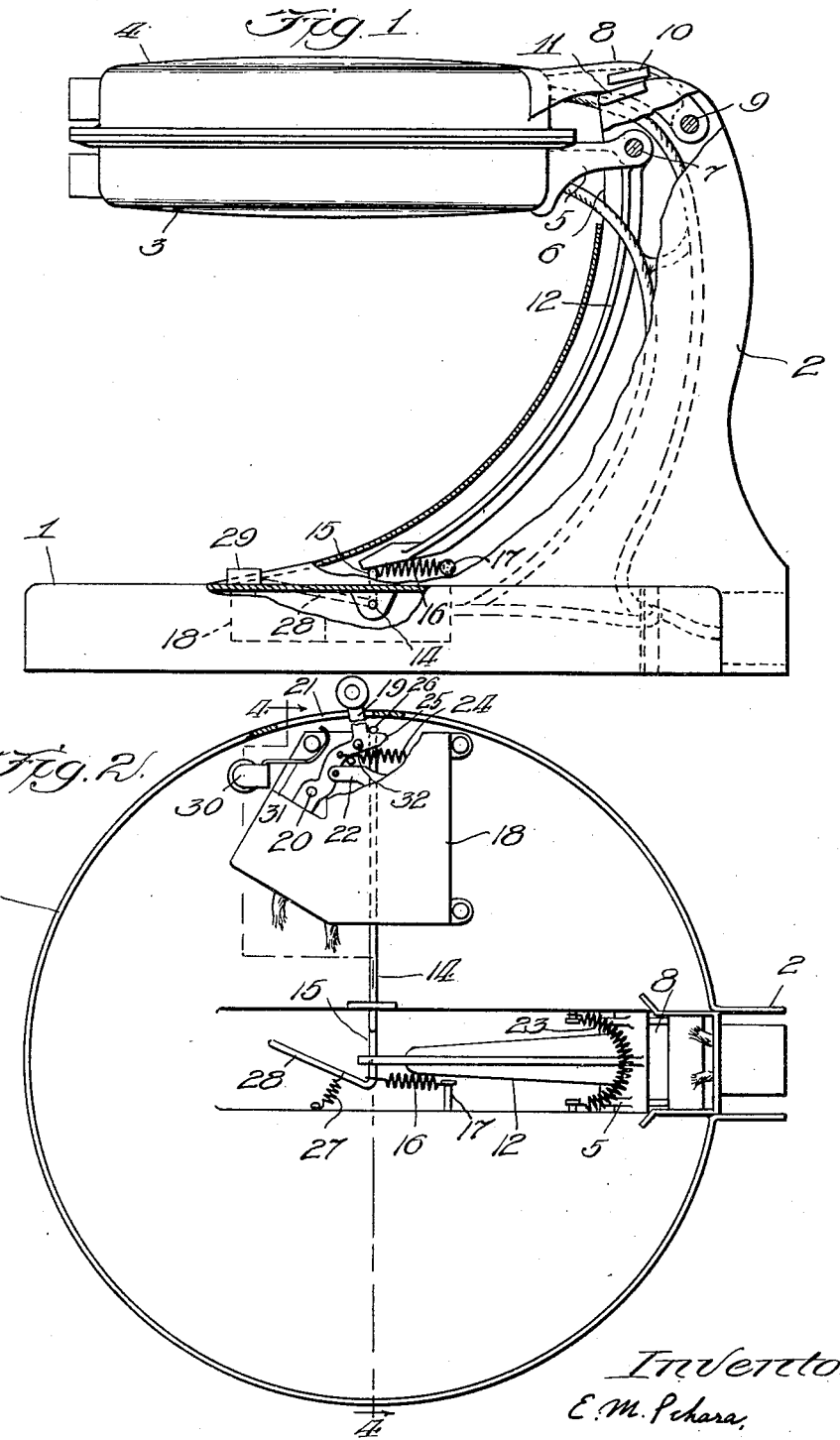

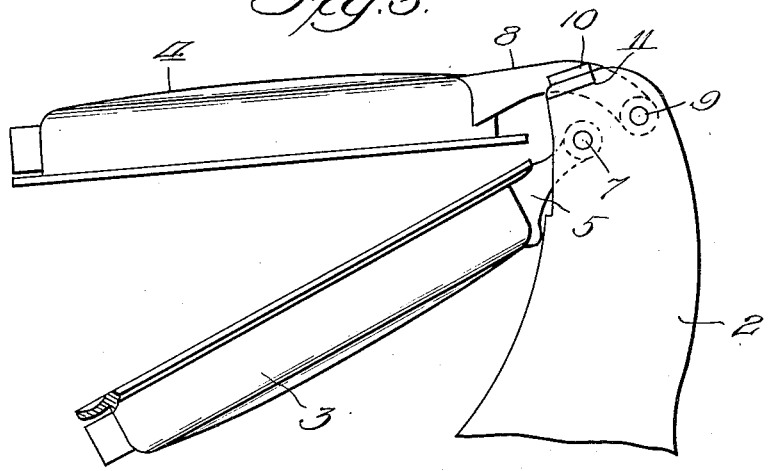
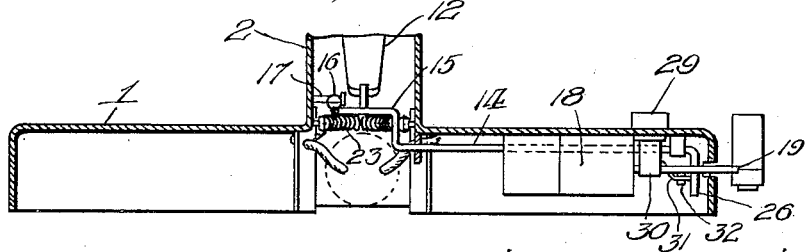
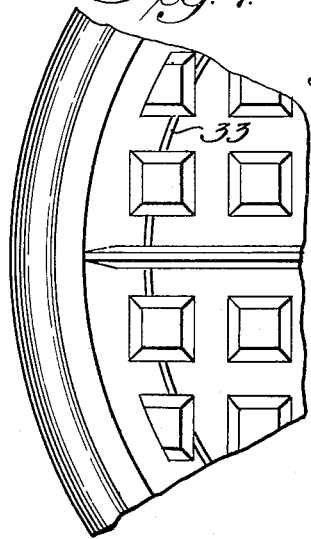
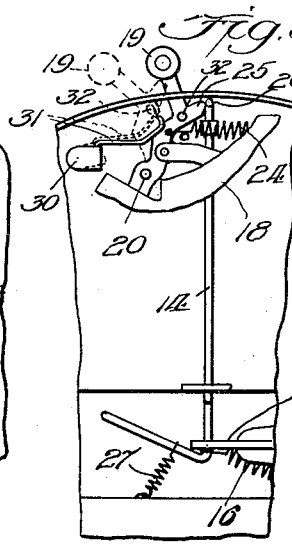
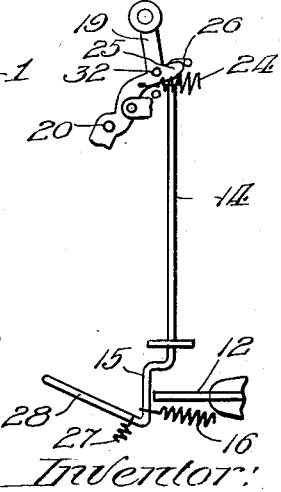

Patented Apr. 20, 1943

2,317,225

UNITED STATES PATENT OFFICE 2,317,225

WAFFLE IRON

Earl M. Schara, Webster Groves, Mo.

Application May 2, 1941, Serial No. 391,488

7 Claims. (Cl. 53—10)

The present invention has for an object an improved waffle iron which does not require the raising of the upper grid member for the purpose of removing the waffle.

This object is accomplished by so mounting the upper and lower grids so that, although the upper grid may be swung up out of the way, when the batter is to be poured into the lower grid, the lower grid drops down to free the waffle from the upper grid at the end of the cooking operation. A further object of the present invention is to produce simple and novel means for automatically controlling the lower grid so as to cause it to fall and expose the waffle at the end of the cooking operation.

The various features of novelty whereby my invention is characterized will hereinafter be pointed out with particularly in the claims; but, for a full understanding of my invention and of its objects and advantages, reference may be had to the following detailed description taken in connection with the accompanying drawings, wherein:

Figure 1 is a view showing in side elevation a waffle iron constructed in accordance with the present invention, portions of the stationary support being broken away to expose working parts in the interior thereof; Fig. 2 is a bottom plan view of a device shown in Fig. 1; Fig. 3 is a view similar to Fig. 1, showing the device in waffle-serving condition, the lower portion of the supporting pedestal and base being omitted; Fig. 4 is a section on line 4—4 of Fig. 2, the device being shown right side up, instead of upside down, as in Fig. 2; Fig. 5 is a view similar to Fig. 2, showing only a fragment of the device, with the parts in different positions than in Fig. 2; Fig. 6 is a view similar to Fig. 5, showing a lesser portion of the device than does Fig. 5, with the parts in their release positions, as distinguished from their locking or holding positions, indicated in Figs. 2 and 5; and Fig. 7 is a top plan view, on a much larger scale, than the other figures, of a fragment of the lower grid or batter receptacle.

Referring to the drawings, I represents a base from which rises a suitable pedestal 2, both being hollow. Movably supported on the upper end of the pedestal are lower and upper batter-receiving or grid elements 3 and 4, respectively. In the arrangement shown, the part 3 has fixed therto or integral therewith a short, rearwardly-projecting radial arm 5 extending into the interior of the pedestal through a front opening 6 in the latter; a hinge pin 7 extending through the side walls of the pedestal and through the rear end of the arm serving to secure the lower grid member hingedly to the pedestal. The pedestal is open at the upper end and, fixed to or integral with the upper grid member is an arm 8 that extends rearwardly, directly above the arm 5, and then downwardly through the top of the pedestal so as to bring its free end behind and somewhat above the free end of the arm 5. A hinge pin 9 extends through the side walls of the pedestal and through the arm 8 near the free end of the latter, so as hingedly to support the upper grid member for swinging movements about a horizontal axis parallel to the hinge axis of the lower grid. Suitable stop means is provided to limit the downward swinging movement of the upper grid. In the arrangement shown, this consists of a lug 10 on the arm 8, and a lug or projection 11 so disposed on the pedestal that when the waffle iron is open, as in Fig. 3, the lug 10 rests upon the projection 11 and prevents further downward swinging movement of the upper grid.

Fixed to the free end of the arm 5 of the lower grid is a long curved bar or stem 12 extending down through the interior of the hollow pedestal into the vicinity of the base. Suitable means are provided for cooperating with the lower end of this bar or stem so as either to hold the lower grid in a horizontal position, as shown in Fig. 1, or permit the grid to drop down, as in Fig. 3. In the arrangement shown, the holding or catch means comprises a rod 14 extending more or less radially of the base within the hollow interior of the latter; this rod extending across and having its inner end underlying the free end of the bar when the lower grid is in its up position. The inner end of the rod 14 has an offset portion or crank 15 so that, by suitably mounting the rod for turning means about its axis, the part 15 may either be brought into a position in which it engages the lower end of the bar 12, as in Figs. 1, 2 and 5, or into a position in which it stands clear of the bar, as indicated in Fig. 6. In the first of these positions, the part 15 prevents the free end of the bar from swinging downwardly, as it must in order to permit the lower grid to drop; whereas, in the second position, the bar is no longer restrained and the lower grid may swing down. Normally, the crank 15 is held in its locking or holding position, by means of a tension spring 16 connected at one end to the part 15 and at the other end to a stationary pin 17 fixed to the base of the device; the spring being arranged crosswise of the rod 14.

In accordance with one feature of my invention, I control the catch device by the same means that sets the timing device and, preferably, opens and closes the circuit that energizes the heating elements for the grids. In this way, by moving a handle or lever, the spring of a timing device may be wound up and the heating circuit be closed and then, at the end of a predetermined cooking period, the circuit is automatically opened and the catch released by the return of the handle or lever to its starting point.

The timing device and the switch for the heating circuit are represented simply by a casing or housing 18 past or through which the rod 14 extends. The controlling handle or lever 19 is pivotally connected to this housing or casing at 20, and extends out to the exterior of the base through an opening 21 in the side of the latter. This handle or lever may be regarded as being the switch lever. The winding or setting of the timing device is brought about by the movement of a link or lever 22, one end of which is connected to the handle or lever 19 so as to be actuated by the latter. Normally, a spring 24, attached at one end to the lever 19 and at the other end to a stationary part, holds the lever in its idle position at one end of the slot 21, as indicated in Fig. 2; the switch at this time being open. When the lever is swung in the counter-clockwise direction, as viewed in Figs. 2 and 5, to the dotted line position shown in Fig. 5, the switch is closed, and the spring of the timing device is wound. The lever 19 has thereon a little cam-shaped projection 25 which underlies the rod 14 when the lever is in its off position, as shown in Fig. 2. The adjacent end of the rod 14 is bent down, as indicated at 26 and is held against the outer edge of the cam element 25 by a little spring 27 that pulls lengthwise on the rod. One end of the spring is anchored to the base of the device while the other is connected to a more or less radial arm 28 on the free end of the crank 15. This arm serves as a stop to prevent the rod 14 from swinging too far when travelling from its idle position to its working position. This can best be seen in Fig. 1 which shows the spring 16 lying above the rod proper and tending to turn it in the clockwise direction, whereas the free end of the arm or finger 28 engages the top wall of the base member of the device. Since the spring and the arm or finger 28 extend in opposite directions from the rod, the spring can turn the rod no farther in the counter-clockwise direction than it already has in Fig. 1. When the lever 19 is swung in the counter-clockwise direction, from the position indicated in Fig. 2, the cam projection, acting on the downturned end 26 of the rod 14, pulls this rod lengthwise far enough to permit the cam to clear the same, whereupon the spring 21 is left free to draw the rod back to its normal position, as in Fig. 2.

The dotted line position of the lever 19 in Fig. 5 is the one to which it is brought at the beginning of each cooking operation. Then, as is usual in the case of timing devices, the lever slowly returns to its starting position. By the time that the lever gets back to the full line position of Fig. 5, it finds the downwardly-projecting end 26 of the rod lying directly in its path and, therefore, it acts thereon, pushing it ahead of the same and turning the shaft, as shown in Fig. 6. This movement is sufficient to carry the crank end of the rod clear of the bar 12 extending downwardly from the lower grid, so that the lower grid drops into the position shown in Fig. 3. During the slight angular movement of the lever 19 that takes place afterwards, the cam element 25 slips past the down-turned end 26 of the rod, bringing the parts into the positions illustrated in Fig. 2. Then, when the lower grid is again swung up, the free end of the bar 12 simply strikes the crank 15 and pushes the same forwardly until it clears the lower end of the bar. As soon as this occurs, the spring 16 comes into play and turns the crank and its rod back into the locking position where they will stay until the next tripping operation following the cooking of another waffle.

If desired, a suitable resilient buffer, such as that indicated at 23, may be located behind the lower end of the bar 12. When the lower grid swings down, the bar strikes this buffer which absorbs the forces produced by the downwardly-moving grid and permits the grid to come to a standstill gently.

When the grids are first heated as a preliminary step to a cooking operation, the time between the making and the breaking of the heating circuit determined by the timing device, if the latter be calibrated to provide just enough heat during each cycle for cooking the second or other subsequent waffles, will not be sufficient for the cooking of the first waffle. This is due to the fact that the grids must be given a predetermined warming to bring them into the condition in which they are when batter for the second or third waffle is poured. I have therefore provided means for locking the lever 19 in its on position, so that in beginning cooking operations, the timing of the cooking of the first waffle does not begin until the user is satisfied that the preliminary warming of the grids has been properly effected. In the arrangement shown, there is a little button 29 on top of the base of the apparatus. This button is fixed to the upper end of a vertical stud 30 that extends through and is rotatable in the top wall of the hollow base. Fixed to the lower end of the stud is a wire hook or curved finger 31 which, when the lever 19 is swung into its "on" position, may be engaged with a downwardly-projecting pin 32 on the lever. Normally, the hook or finger stands in the position shown in full lines in Fig. 5, so that it is clear of the path of the pin 32 when the lever is swung in the counterclockwise direction. However, after the lever has reached its "on" position, as indicated in dotted lines in Fig. 5, the button 29 may be turned so as to engage the hook with the pin, as shown in dotted lines in Fig. 5. A few minutes before it is desired to pour the batter for the first waffle, the controlling lever or handle is shifted into its "on" position and is locked there by the turning of the button. This causes the current to be turned on and the heating elements for the grids to be energized, and prevents the timing device from beginning to function until the user is ready to release the controlling lever from its holding device by turning the button 29 backward to disengage the hook from the pin 32.

When the batter for a waffle is to be poured, assuming the parts to be in the position shown in Fig. 1, the upper grid is simply swung up and back, being again lowered after a sufficient amount of batter has been deposited in the lower grid. It is desirable that the upper grid rest on the lower grid during the cooking operation, and I have therefore proportioned the parts so that the lugs or projections 10 and 11 do not engage with each other at this time; thus leaving the upper grid free to swing down far enough to make certain of proper setting of the same on the lower grid.

It is not always easy to determine just how much batter of a given consistency should be poured into the lower grid to prevent subsequent overflowing when the upper grid is lowered. I have, therefore, provided a guide which may be in the form of a mark or a little rib or ledge 33 extending entirely around the interior of the lower grid a short distance inwardly from the rim. When enough batter has been poured into the center of the grid to flow out and meet the guide, there will be just enough batter to produce a waffle without overflowing.

It will thus be seen that I have produced a simple, novel and attractive waffle iron construction in which the waffle is moved down away from the upper grid, when cooked, and is thus immediately exposed to the air. The downward slope of the lower grid at this time makes it easy to lift the waffle and cause it to slide off the grid, at least partly through the action of gravity. Therefore, it may be said that when the waffle iron is opened, at the end of a cooking operation, the waffle is served. It will also be seen that after the waffle iron is closed, the upper grid need not again be raised until another batch of batter is to be poured; whereas the lower grid may be raised immediately after the removal of each waffle so that the grids engage each other and do not cool off as rapidly as they would in the "open" positions. Furthermore, I have provided a simple means to afford a preliminary heating of the cooking elements which means, it will be noted, can be used as an auxiliary time controller in the event that a longer cooking period is needed than is permitted by the clockwork.

While I have illustrated and described with particularly only a single preferred form of my invention, I do not desire to be limited to the exact structural details thus illustrated and described; but intend to cover all forms and arrangements which come within the definitions of my invention constituting the appended claims. Also, while I have referred to the device as a waffle iron, it may obviously be designed to cook meat or make toast; and devices for such purposes are intended to be included by the terms "waffle iron" and "members for receiving batter."

I claim:

1. In a waffle iron, a standard, upper and lower members between which batter is placed for cooking, supported from the top of the standard, the supporting means for the lower member being a hinge at the edge of the latter member permitting the same to drop away from the upper member, an arm fixed to the said lower member in the vicinity of the hinge and extending freely down through the standard, and a releasable catch cooperating with the lower end of said arm to hold the lower member up.

2. In a waffle iron, a standard, upper and lower members between which batter is placed for cooking, supported from the top of the standard, the supporting means for the lower member being a hinge at the edge of the latter member permitting the same to drop away from the upper member, an arm fixed to the said lower member in the vicinity of the hinge and extending freely down through the standard, a releasable catch cooperating with the lower end of said arm to hold the lower member up, and a timing device controlling the catch.

3. In a waffle iron, a standard, upper and lower members between between which batter is placed for cooking, supported from the top of the standard, the supporting means for the lower member being a hinge at the edge of the latter member permitting the same to drop away from the upper member, an arm fixed to the said lower member in the vicinity of the hinge and extending freely down through the standard, a releasable catch cooperating with the lower end of said arm to hold the lower member up, a device for controlling the heating of said members, and a timing device for actuating said device and releasing the catch.

4. In a waffle iron, a standard, upper and lower members between which batter is placed for cooking, supported from the top of the standard, the supporting means for the lower member being a hinge at the edge of the latter member permitting the same to drop away from the upper member, an arm fixed to the said lower member in the vicinity of the hinge and extending freely down through the standard, a rod having an element thereon that is movable through oscillations of the rod from an idle position clear of the arm to a working position in which it serves as a stop engaging the arm and preventing the said lower member from dropping, a radial projection on said rod, a timing device, and a part moved by the timing device to engage with said projection and turn the rod to shift said element from its working position to its idle position.

5. In a waffle iron, a standard, upper and lower members between which batter is placed for cooking, supported from the top of the standard, the supporting means for the lower member being a hinge at the edge of the latter member permitting the same to drop away from the upper member, an arm fixed to the said lower member in the vicinity of the hinge and extending freely down through the standard, a releasable catch cooperating with the lower end of said arm to hold the lower member up, a device for controlling the heating of said members, a timing device for actuating said device and releasing the catch, and a catch for restraining said timing device during preliminary warming of said members.

6. In a waffle iron, a standard, upper and lower members between which batter is placed for cooking, supported from the top of the standard, the supporting means for the lower member being a hinge at the edge of the latter member permitting the same to drop away from the upper member, an arm fixed to the said lower member in the vicinity of the hinge and extending freely down through the standard, a rod that is movable lengthwise and angularly about its axis having an element thereon that is movable through oscillations of the rod from an idle position clear of the arm to a working position in which it serves as a stop engaging the arm and preventing the said lower member from dropping, a spring tending constantly to hold said rod at one limit of its lengthwise movement, a radial projection on said rod, a timing device, and a cam moved by the timing device to engage with said projection and turn the rod to shift said element from its working position to its idle position when the cam is travelling in one direction and to engage the projection and move the rod lengthwise against the resistance of said spring to enable the cam to pass the projection while travelling in the other direction.

7. In a waffle iron, a standard, upper and lower members between which the batter is placed for cooking; a hinge connection between the said lower member and the upper part of the standard to support that member for swinging movements between a cooking position in which it is approximately horizontal and a serving position in which it slants sharply downward from the standard, a catch to hold said lower member in its cooking position, a hinge connection between the said upper member to support it for swinging movements about an axis close to that of the other hinge connection between a position in which it rests on the lower member while the latter is horizontal and an upright position that locates it at one side of said lower member and leaves the space above the lower member clear, and means to hold the upper member against following the lower member down when the catch is released.

EARL M. SCHARA.